United States Patent Office 2,774,318
Patented Dec. 18, 1956

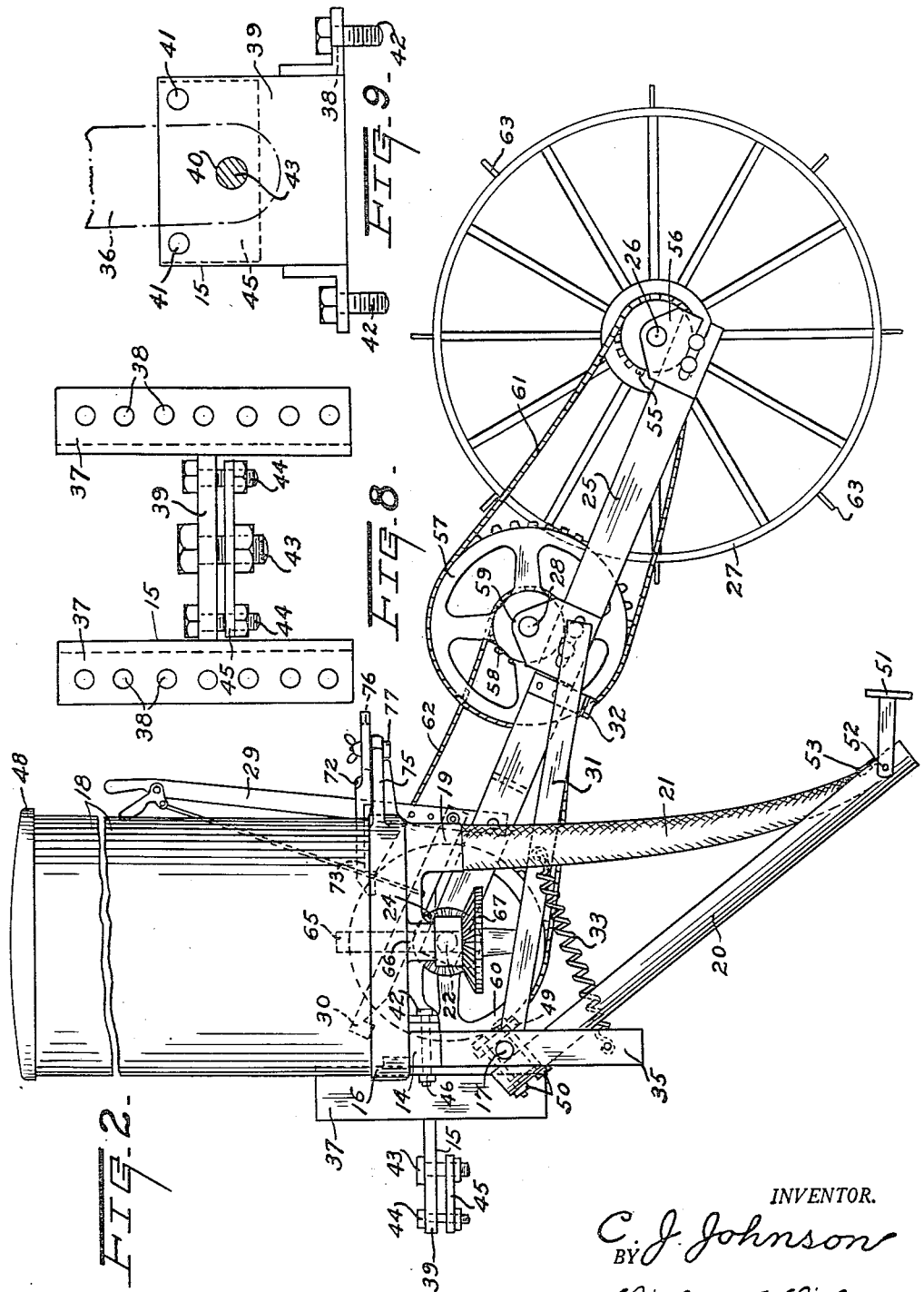

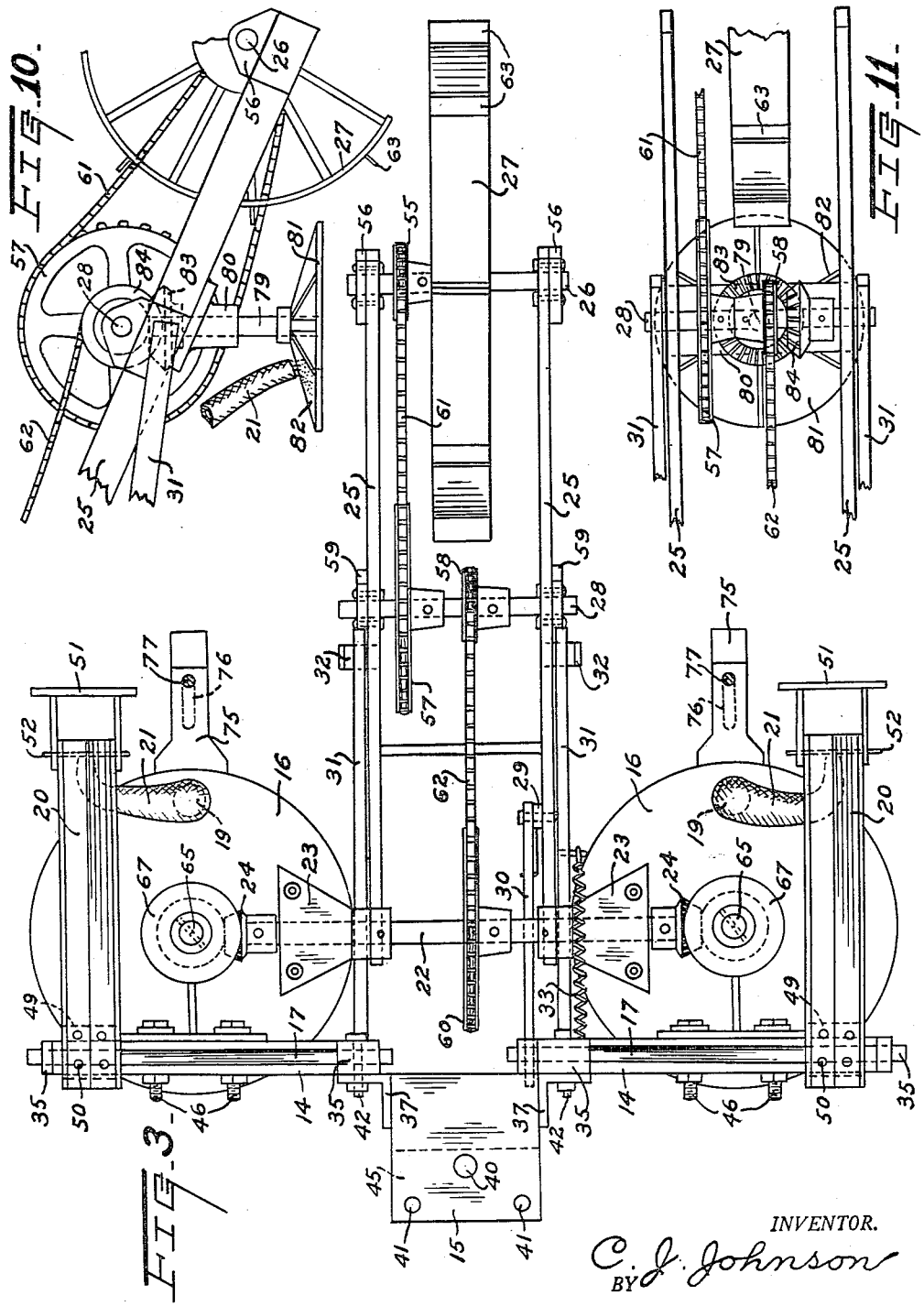

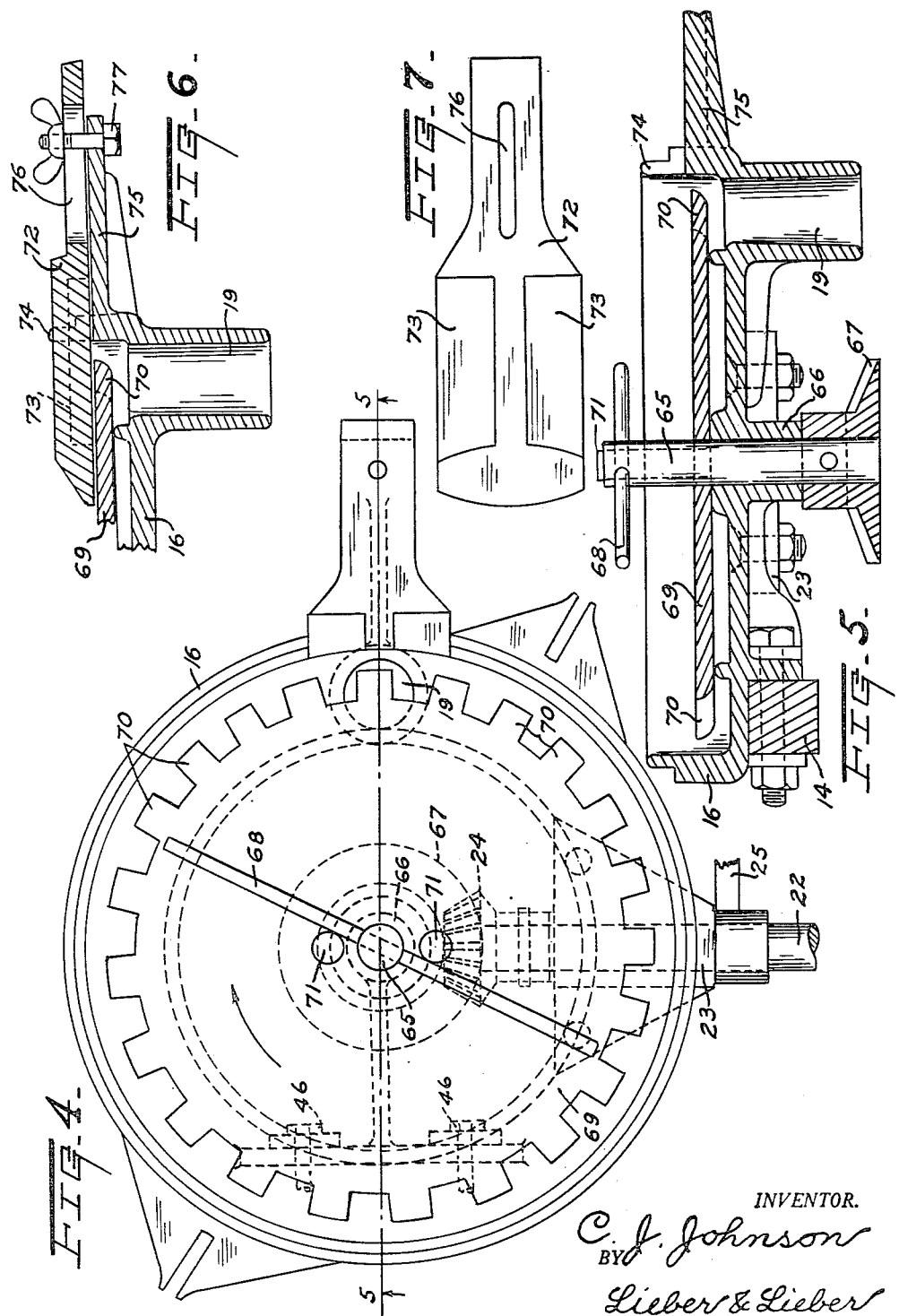

2,774,318

SIDE DRESSING FERTILIZER SPREADER

Clarence J. Johnson, Holmen, Wis.

Application December 10, 1952, Serial No. 325,119

2 Claims. (Cl. 111—59)

The present invention relates in general to improvements in the art of conditioning soil for agricultural purposes, and relates more specifically to improvements in the construction and operation of mechanism for applying soil conditioning media such as fertilizer, lime and the like to farm lands.

The primary object of my invention is to provide an improved agricultural soil conditioning unit which is simple and durable in structure, and which is also highly flexible in adaptation and efficient in use.

When applying fertilizer to agricultural plants arranged in rows, it is very important that the fertilizer be applied in close proximity to the plant roots on opposite sides of the rows. It is also desirable to inject the fertilizer beneath the surface of the ground and to cover the same with earth after it has been thus applied. Then too, when applying certain types of fertilizers and soil or plant conditioners, it is frequently desirable to broadcast the treating material over the surface of the ground and over the plants. Since the time available for the application of such materials is usually limited, the operations must be effected rapidly so that vast acreage may be treated quickly and uniformly with minimum equipment. Such treatment can be most effectively accomplished by a tractor drawn unit which must however be adapted for convenient attachment to tractors having various types of draw bars.

It is therefore an important object of the present invention to provide various improvements in equipment for rapidly and most effectively performing all of the above mentioned functions, and which may be readily associated with any standard farm tractor.

Another important object of the invention is to provide an improved fertilizer distributor or spreader which is especially adapted to perform side dressing of plants arranged in rows, by injecting the fertilizer beneath the soil adjacent to the opposite sides of the plant roots.

A further important object of this invention is to provide improved mechanism which is adapted to effectively cooperate with plants arranged in rows of different widths, and in which the delivery of the fertilizing material is readily controllable and adapted to be entirely interrupted at the will of the operator.

Still another important object of my invention is to provide a soil treating unit adapted to be drawn by diverse types of farm tractors, and which may be interchangeably utilized to either inject or to broadcast soil and plant conditioning or treating materials, and which may be conveniently converted from one use to another.

An additional object of the invention is to provide an improved side dressing fertilizer spreader of very simple and compact construction which may be manufactured and sold at moderate cost, and which may also be operated to simultaneously fertilize a pair of adjacent rows of plants.

Another object of this invention is to provide a side dressing fertilizer distributing assemblage in which the delivery of fertilizing material is controlled by mechanism operable by the advancement of the unit along the ground, and wherein the flow of fertilizer may be stopped instantly whenever desired.

These and other objects and advantages of the invention will be apparent from the following description from which it will be noted that the gist of my invention is the provision of a portable fertilizer spreading unit capable of being attached to and propelled by farm tractors having diverse types of draw bars, and wherein the mechanism for controlling the flow of the fertilizing material to the plants is operable by the advancement of the spreader assemblage along the ground while the fertilizer is injected into the soil at the opposite sides of adjacent rows of plants and is covered by earth as the unit proceeds along the plant rows.

A clear conception of the improved features constituting this invention and of the construction and operation of a typical fertilizer distributing unit embodying the same, may be had by referring to the drawings accompanying and forming a part of this specification wherein like reference characters designate the same or similar parts in the various views.

Fig. 2 is a side elevation of the same fertilizer spreading unit;

Fig. 3 is a bottom view of the same assemblage;

Fig. 4 is an enlarged top view of one of the fertilizer feeding mechanisms;

Fig. 5 is a central vertical section through the mechanism of Fig. 4, taken along the line 5—5;

Fig. 6 is a similar section through the flow control plate of the feed mechanism;

Fig. 7 is a bottom view of the flow control plate shown in section in Fig. 6;

Fig. 8 is an enlarged front view of the improved draw bar attaching device of the spreader unit;

Fig. 9 is a top view of the device shown in Fig. 8, showing a simple tractor draw bar applied thereto in dot-and-dash lines;

Fig. 10 is a fragmentary side elevation of a fertilizer broadcasting attachment adapted to be associated with the spreader unit, showing the position of the chain drives reversed from that shown in Figs. 2 and 3; and Fig. 11 is a similarly fragmentary bottom view of the assemblage shown in Fig. 10.

Figure 1:
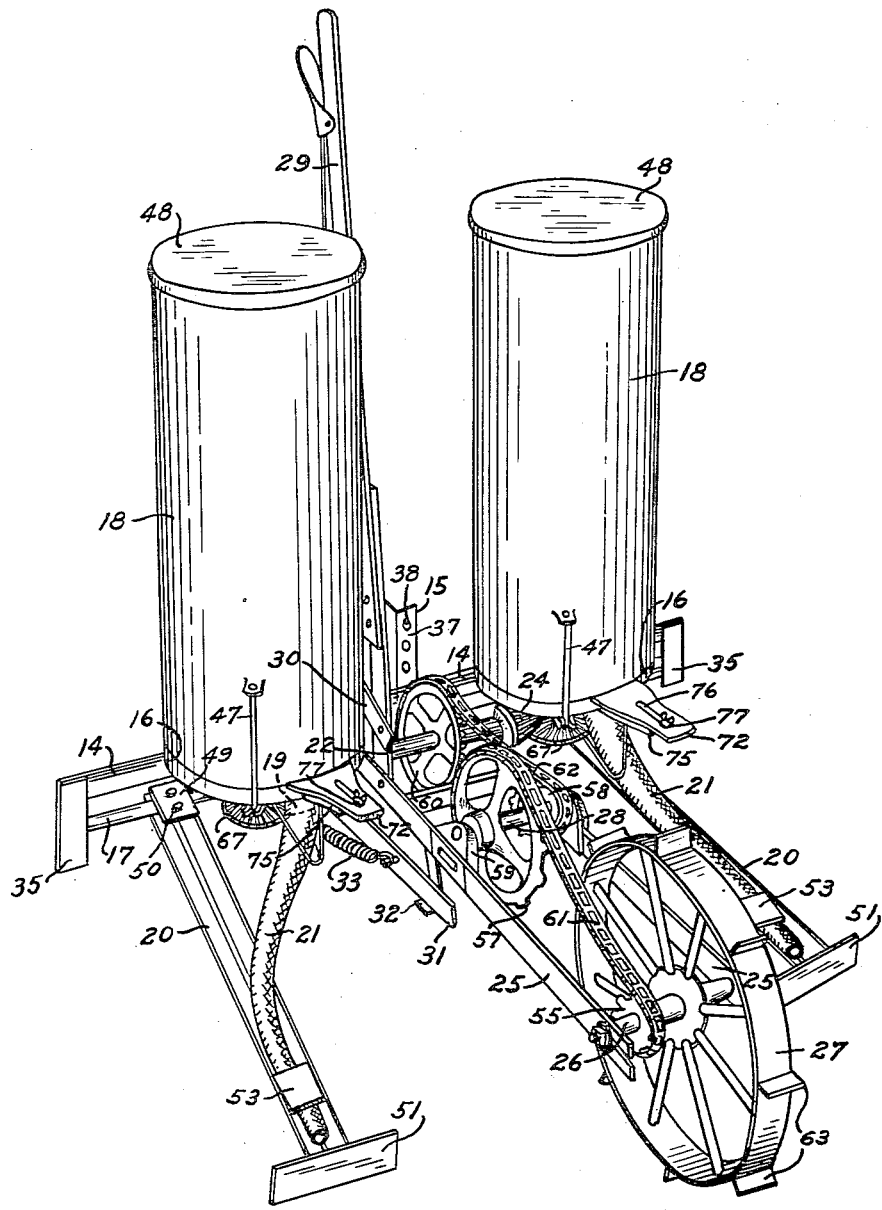
Fig. 1 is a rear and side perspective view of one of the improved side dressing fertilizer spreaders.

While the invention has been shown and described as having been applied to a tractor drawn unit adapted to simultaneously side dress two rows of plants, it is not the intention to unnecessarily restrict the utility of some of the improved features by virtue of this particular embodiment; and it is also contemplated that specific descriptive terms employed herein be given the broadest possible interpretation consistent with the disclosure.

Referring to the drawings, the improved side dressing fertilizer spreading and distributing unit shown in Figs. 1 to 9 inclusive, comprises in general a transportable frame composed of two oppositely outwardly directed side beams 14 rigidly interconnected by a forwardly extending central draft assemblage 15 and each having a sturdy base plate 16 firmly attached thereto and also being provided with a horizontal pivot shaft 17 beneath its base plate 16; a fertilizer receptacle 18 mounted upon each of the frame plates 16 and each having an open lower end communicable with a fertilizer outlet 19 formed in its supporting base plate 16; a fertilizer distributing element or V-shaped trough 20 swingably suspended from each of the pivot shafts 17 beneath the adjacent base plate 16 and extending rearwardly and downwardly from its suspension shaft toward the ground; a flexible tube 21 connecting each receptacle outlet 19 with the interior of the lower swinging end of the adjacent trough 20; a rotary transverse power shaft 22 journalled in bearings 23 secured to the base plates 16 and having a bevel pinion 24 attached to each of its opposite ends; a pair of parallel rearwardly extending and downwardly inclined sturdy beams 25 swingably suspended from the power shaft 22 adjacent to the bearings 23, and having their lower rear ends interconnected by a rotary axle shaft 26 to which is secured a wheel 27 adapted to ride upon the ground, while their medial portions are also interconnected by a rotary countershaft 28; a hand lever 29 rigidly secured to one of the beams 25 and having thereon a pivoted latch bar 30 cooperable with one of the frame beams 14 to hold the beams 25 and the wheel 27 away from the ground; a pair of levers 31 swingably suspended from the pivot shafts 17 and coacting with L-shaped brackets 32 secured to the beams 25, and being urged downwardly by springs 33 to press the wheel 27 against the ground when the latch bar 30 is released; and fertilizer flow controlling mechanism confined within each of the receptacles 18 and being operable by the wheel 27 to regulate and control the delivery of fertilizing material through the outlets 19 to the troughs 20.

The opposite side beams 14 of the main frame should be of sturdy construction, and the base plates 16 and the draft assemblage 15 should be firmly but detachably attached to these beams 14 which may also be provided with depending end plates 35 in which the pivot shafts 17 are mounted and to which the assemblage 15 may be attached. The draft assemblage 15 is of improved construction as shown in detail in Figs. 8 and 9, in order that it may be attached to tractor draw bars 36 disposed at various distances from the ground, as well as to draw bars of diverse shapes. The assemblage 15 therefore consists of a pair of laterally spaced upright angle irons 37 each having one flange facing the spreader frame 14 and provided with a series of holes 38, and a horizontal draft plate 39 secured to and spanning the space between the angle irons 37 and provided with a large central opening 40 disposed between and rearwardly of two smaller openings 41. The holes 38 in the angle irons 37 may be utilized to fasten the draft assemblage 15 to the frame beams 14 and inner plates 35 with the aid of bolts 42 so as to position the plate 39 at any desired distance from the ground, and the large opening 40 is adapted to receive a large draft bolt 43 cooperable with a straight draw bar 36 as in Fig. 9, while the two smaller openings 41 are likewise adapted to receive smaller bolts 44 which will cooperated with U-shaped drawbars such as are provided in some farm tractors. The bolts 43, 44 cooperate with a lower retainer plate 45 to maintain the drawbars in position against the bottom of the draft plate 39, and the assemblage 15 may thus be made to cooperate with all standard farm tractor drawbars 36. The base plates 16 are securely fastened to the heavy side beams 14 of the main frame by bolts 46 coacting with flanges formed integral with the plates 16.

The powdered fertilizer receptacles 18 may be tubular casings of ample capacity the lower open ends of which snugly coact with the adjacent base plates 16 and are secured thereto by bolts 47, and the upper ends of which are normally closed by covers 48. The upper ends of the rigid inclined V-shaped troughs 20 are adapted to be firmly clamped to the adjacent pivot shafts 17 by means of clamping plates 49 and bolts 50 as shown in Figs. 2 and 3, so as to permit variation of the distance between the two troughs 20 in order to conform with the spacing between the plant rows; and the lower extremities of the troughs 20 are adapted to drag along the ground and to form V-shaped grooves in the soil near the side roots of the plants in the two adjacent rows while the unit is advancing. The lower end portion of each trough 20 is provided with a trailing spade plate 51 swingably suspended from a pivot pin 52 and which is cooperable with the adjacent lower trough end to cover the fertilizer delivered therefrom with earth as the machine advances; and the flexible tubes 21 which connect the receptacle outlets 19 with the interior of the lower trough ends, may be bent so as to accommodate variations in the positions of the troughs 20 and have their lower ends held in place within the troughs by retainers 53.

The horizontal rotary power shaft 22 which is journalled for rotation in the bearings 23 secured to the base plates 16, also provides a pivot for the downwardly and rearwardly inclined beams 25, and the wheel carrying axle shaft 26 which interconnects the lower trailing ends of these beams 25 also has a sprocket 55 attached thereto and is mounted in bearings 56 which are adjustable along the beams 25. The countershaft 28 which interconnects the medial portions of the beams 25, has adjacent large and small sprockets 57, 58 respectively secured thereto and is mounted in bearings 59 which are also adjustable along the beams 25. Another large sprocket 60 is secured to the power shaft 22, and a chain 61 drivingly connects the sprockets 55, 57 while another chain 62 likewise connects the sprockets 58, 60, so that rotation of the wheel 27 while in contact with the ground and when the unit is advancing, will impart rotation to the power shaft 22. The wheel 27 is preferably provided with cleats 63 in order to insure positive driving and the adjustable bearings 23, 59 facilitate proper tensioning of the chains 61, 62. The hand lever 29 which is rigidly attached to one of the beams 25 is also pivoted upon the power shaft 22 so that a pull on the handle of this lever 29 will raise the wheel 27 and the troughs 20 away from the ground and the latch bar 30 will then function to hold these parts elevated; but when the latch is released, the springs 33 associated with the levers 31 which bear against the brackets 32 and which are fastened to the frame plates 35 will act quickly to lower both the wheel 27 and the troughs 20 toward the ground, see Fig. 2.

The fertilizer flow controlling mechanism which is confined within each of the receptacles 18, is shown in detail in Figs. 4 to 7 inclusive, and each of these mechanisms comprises an upright shaft 65 mounted in a central bearing 66 of the adjacent base plate 16 and having a bevel gear 67 at its lower end meshing with the adjacent pinion 24, while its upper end is pierced by a transverse revolvable agitator pin 68; and a revolving disk 69 embracing the shaft 65 and resting upon the base plate 16 and being provided with an annular series of peripheral projections 70 adapted to travel over the adjacent outlet 19, the disk 69 being rotatable by the revolving pin 68 through a pair of upright pins 71 secured to the disk. A regulating slide 72 having bottom recesses 73 therein and which extends over the path of revolution of the disk projections 70 through a slot 74 in each base plate 16 and is adjustable along a shelf 75 formed integral with the adjacent plate 16, is provided with an elongated adjusting slot 76 coacting with a bolt 77 carried by the adjoining shelf 75. Each slide 72 may be radially adjusted with respect to the adjacent rotating disk 69 so as to cover the opening 19 and the revolving projections 70 more or less, and to thereby accurately control the flow of pulverulent fertilizer from within each receptacle 18 to the corresponding trough 20 through the opening 19 and tube 21.

When the improved side dressing fertilizer spreader has been properly constructed and assembled as hereinabove described, it may be hitched to the draw bar 36 of any standard farm tractor, and the troughs 20 should be adjusted upon their pivot shafts 17 so as to properly cooperate with the roots of the plant rows while the wheel 27 is riding upon the ground midway between these rows. The receptacles 18 should be provided with an abundant supply of powdered commercial fertilizer, and as the unit advances along the ground with the latch bar 30 released and the wheel 27 and troughs 20 riding along the space between the adjoining plant rows, controlled quantities of the fertilizer will flow past the slides 72 and the revolving disk projections 70 through the openings 19 and tubes 21 and from the lower ends of the troughs 20 by virtue of the rotation of the disks 69 through the chains 61, 62, shafts 22, 65 and gears 24, 67. The fertilizer thus delivered into the grooves near the plant roots formed by the lower ends of the rigid troughs 20 will be progressively covered with earth by the advancing spade plates 51, and the slides 72 may be readily adjusted to accurately regulate the quantity of fertilizer delivered to each row of plants by merely manipulating the wing nuts of the bolts 77. The flow of fertilizer may however be interrupted either by stopping the tractor, or by pulling the lever 29 so as to simultaneously raise the wheel 27 and the troughs 20 away from the ground.

The improved fertilizer distributing unit may also be utilized to broadcast fertilizer and other pulverulent plant and soil treating material, over the ground, with the aid of an attachment such as shown in Figs. 10 and 11. This attachment comprises a substantially upright shaft 79 journalled in a bearing 80 carried by the medial portions of the beams 25; a rotary broadcasting disk 81 secured to the lower end of the shaft 79 in front of the driving wheel 27 and having thereon an annular series of vanes 82; a bevel gear 83 secured to the upper end of the upright shaft 79; and a bevel pinion 84 meshing with the gear 83 and being secured to the rotary countershaft 28 journalled in the bearings 59 carried by the beams 25. One or both of the flexible fertilizer conducting tubes 21 may then be directed toward the top of the distributor disk 81; and when the unit is being operated as a broadcaster with the wheel 27 riding along the ground, the chain 61 and sprockets 55, 57 will rotate the shafts 28, 79 and will cause the revolving vanes 82 to throw the fertilizer deposited upon the disk 81 by the tube or tubes 21 outwardly over the ground in all directions by centrifugal force. In this case the flow control mechanisms will also function to regulate the quantity of material being delivered to the broadcasting disk 81, and the rotation of this disk will be stopped whenever the wheel 27 is elevated away from the ground by the hand lever 29 and latch bar 30, or when the unit is stopped.

From the foregoing detailed description it will be apparent that the present invention provides an improved fertilizer distributing unit which may be readily associated with and propelled by various types of standard farm tractors, and can be used effectively either as a side dresser or a broadcaster for fertilizer and other soil and plant treating materials. The improved draft assemblage 15 enables the unit to be coupled to tractors having straight draw bars 36 or other forms of standard draw bars, and the propelling wheel 27 functions to actuate the fertilizer flow controlling mechanism when the unit is employed either as a side dressing outfit or as a pulverized material broadcasting device. The improved construction of the rigid fertilizer delivery troughs 20 and of the spade plates 51 associated therewith, makes it possible to automatically bury the fertilizer at the opposite sides of the plants near the roots thereof, while the hand lever 29 may be manipulated to quickly stop the flow of material from the receptacles, and to simultaneously elevate the troughs 20 away from the ground. The troughs 20 may also be quickly and conveniently adjusted to accommodate plant rows having different spacings, and the spreader unit has proven highly satisfactory and successful in actual use.

It should be understood that it is not desired to limit this invention to the exact details of construction and operation of the fertilizer distributor herein specifically shown and described, for various modifications within the scope of the appended claims may occur to persons skilled in the art.

I claim:

1. In a fertilizer spreader, a transportable frame, a pair of laterally spaced fertilizer receptacles fixedly mounted upon said frame and each having a rear lower outlet, a rearwardly and downwardly inclined fertilizer distributing trough suspended from said frame beneath each of said receptacles and each having its trailing lower end formed to travel beneath the ground to produce a shallow trench, means for effecting lateral adjustment of each of said troughs relative to the adjacent receptacle to vary the distance between the troughs, a flexible fertilizer conducting conduit connecting each receptacle outlet with the lower end portion of the adjacent trough for distribution of the fertilizer within said trenches, a plow blade carried directly by the trailing end of each trough for promptly covering the fertilizer deposited within said trenches, a rotary disk within each of said receptacles for controlling the flow of fertilizer through the said outlets, a transverse shaft journalled on said frame and connected by bevel gearing to both of said disks, a pair of laterally spaced rearwardly extending rigid beams having their front ends swingably suspended from said shaft between said receptacles, a ground engaging wheel journalled on the rear ends of said beams and propelled along the ground during the forward advancement of the frame, a drive for imparting rotary motion from said wheel to said shaft, a lever secured to at least one of said beams for elevating said wheel from the ground, and a spring coacting with said frame and with a medial portion of one of said beams for constantly urging said wheel toward ground engaging position.

2. In a fertilizer spreader, a transportable frame having thereon a transverse pivot shaft, a pair of laterally spaced fertilizer receptacles fixedly mounted upon said frame above said shaft and each having a rear lower outlet, a rearwardly and downwardly inclined fertilizer distributing trough swingably suspended from said shaft beneath each of said receptacles and each having its trailing lower end formed to travel beneath the ground to produce a shallow trench, means for effecting lateral adjustment of each of said troughs along said shaft and relative to the adjacent receptacle to vary the distance between the troughs, a flexible fertilizer conducting conduit connecting each receptacle outlet with the lower end portion of the adjacent trough for distribution of the fertilizer within said trenches, a plow blade carried directly by the trailing end of each trough for promptly covering the fertilizer deposited within said trenches, a rotary disk within each of said receptacles for controlling the flow of fertilizer through the said outlets, a transverse power shaft journalled on said frame and connected by bevel gearing to both of said disks, a pair of laterally spaced rearwardly extending rigid beams having their front ends swingably suspended from said power shaft between said receptacles, a ground engaging wheel journalled on the rear ends of said beams and propelled along the ground during forward advancement of the frame, a drive for imparting rotary motion from said wheel to said power shaft, a lever secured to at least one of said beams for elevating said wheel from the ground, an arm swingably suspended from said pivot shaft and coacting with a medial portion of said beams, and a spring coacting with said frame and with a medial portion of said arm for constantly urging said wheel toward ground engaging position.

References Cited in the file of this patent

UNITED STATES PATENTS

| Number | Name | Date |
|---|---|---|
| 299,405 | Kulp | May 27, 1884 |
| 371,388 | Smith et al. | Oct. 11, 1887 |
| 1,053,944 | Frantz et al. | Feb. 18, 1913 |
| 1,318,819 | Ten Broeck et al. | Oct. 14, 1919 |
| 1,431,247 | Nightingale | Oct. 10, 1922 |
| 1,493,970 | Dubois | May 13, 1924 |
| 1,914,963 | Stephens | June 20, 1933 |
| 2,024,778 | Ray | Dec. 17, 1935 |
| 2,106,645 | Moorhead | Jan. 25, 1938 |
| 2,338,320 | Donovan et al. | Jan. 4, 1944 |
| 2,529,889 | Sullivan | Nov. 14, 1950 |
| 2,687,238 | Tanke | Aug. 24, 1954 |

FOREIGN PATENTS

| 638,172 | Great Britain | May 13, 1950 |